(12) United States Patent
Valecha et al.

(10) Patent No.: US 11,238,178 B2
(45) Date of Patent: Feb. 1, 2022

(54) BLOCKCHAIN NETWORK TO PROTECT IDENTITY DATA ATTRIBUTES USING DATA OWNER-DEFINED POLICIES

(71) Applicant: International Business Machines Corporation, Armonk, NY (US)

(72) Inventors: Vinod A. Valecha, Pune (IN); Krzysztof Rudek, Nowy Wisnicz (PL); Grzegorz Piotr Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/737,342

(22) Filed: Jan. 8, 2020

(65) Prior Publication Data
US 2021/0209246 A1 Jul. 8, 2021

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01)

(58) Field of Classification Search
CPC ............................ G06F 21/6245; G06F 21/602
USPC ......................................................... 726/26
See application file for complete search history.

(56) References Cited

U.S. PATENT DOCUMENTS

| | | | |
|---|---|---|---|
| 8,341,715 B2 * | 12/2012 | Sherkin | G06F 21/6218 726/10 |
| 8,613,004 B2 * | 12/2013 | Hacigumus | G06F 9/5072 719/328 |
| 9,130,941 B2 | 9/2015 | John et al. | |
| 2012/0023332 A1 * | 1/2012 | Gorodyansky | H04L 63/105 713/168 |
| 2012/0144407 A1 * | 6/2012 | Hacigumus | G06F 9/5072 719/328 |
| 2012/0321083 A1 * | 12/2012 | Phadke | H04L 63/0428 380/255 |
| 2014/0047513 A1 * | 2/2014 | van 't Noordende | H04L 63/0823 726/4 |
| 2015/0381607 A1 * | 12/2015 | Patton | H04L 63/045 713/175 |

(Continued)

FOREIGN PATENT DOCUMENTS

| | | |
|---|---|---|
| CN | 109040057 A | 12/2018 |
| EP | 3223164 A2 | 5/2013 |

OTHER PUBLICATIONS

Onik MM, Kim CS, Lee NY, Yang J. Privacy-aware blockchain for personal data sharing and tracking. Open Computer Science. Jan. 1, 2019;9(1):80-91. (Year: 2019).*

(Continued)

*Primary Examiner* — Syed A Zaidi
(74) *Attorney, Agent, or Firm* — Yee & Associates, P.C.

(57) ABSTRACT

Applying data owner-defined data protection policies for identity data security within a blockchain environment is provided. A data sharing request for an identity data attribute corresponding to a data owner is received from a data consumer. A data protection policy defined by the data owner that corresponds to the identity data attribute requested by the data consumer is retrieved from a blockchain. The data protection policy is applied to the identity data attribute requested by the data consumer to determine amount of data sharing with the data consumer.

20 Claims, 5 Drawing Sheets

(56) References Cited

U.S. PATENT DOCUMENTS

2017/0093826 A1* 3/2017 Werneyer .............. H04L 63/062
2019/0036887 A1   1/2019 Miller
2019/0109707 A1   4/2019 Ajoy

OTHER PUBLICATIONS

Zhang, Xiaoshuai, and Stefan Poslad. "Blockchain support for flexible queries with granular access control to electronic medical records (EMR)." 2018 IEEE International conference on communications (ICC). IEEE, 2018. (Year: 2018).*
NPL Search Terms (Year: 2021).*
Onik et al., "Privacy-aware Blockchain for Personal Data Sharing and Tracking," Open Computer Science, vol. 9, Issue 1, 2019, pp. 80-91. https://doi.org/10.1515/comp-2019-0005.

* cited by examiner

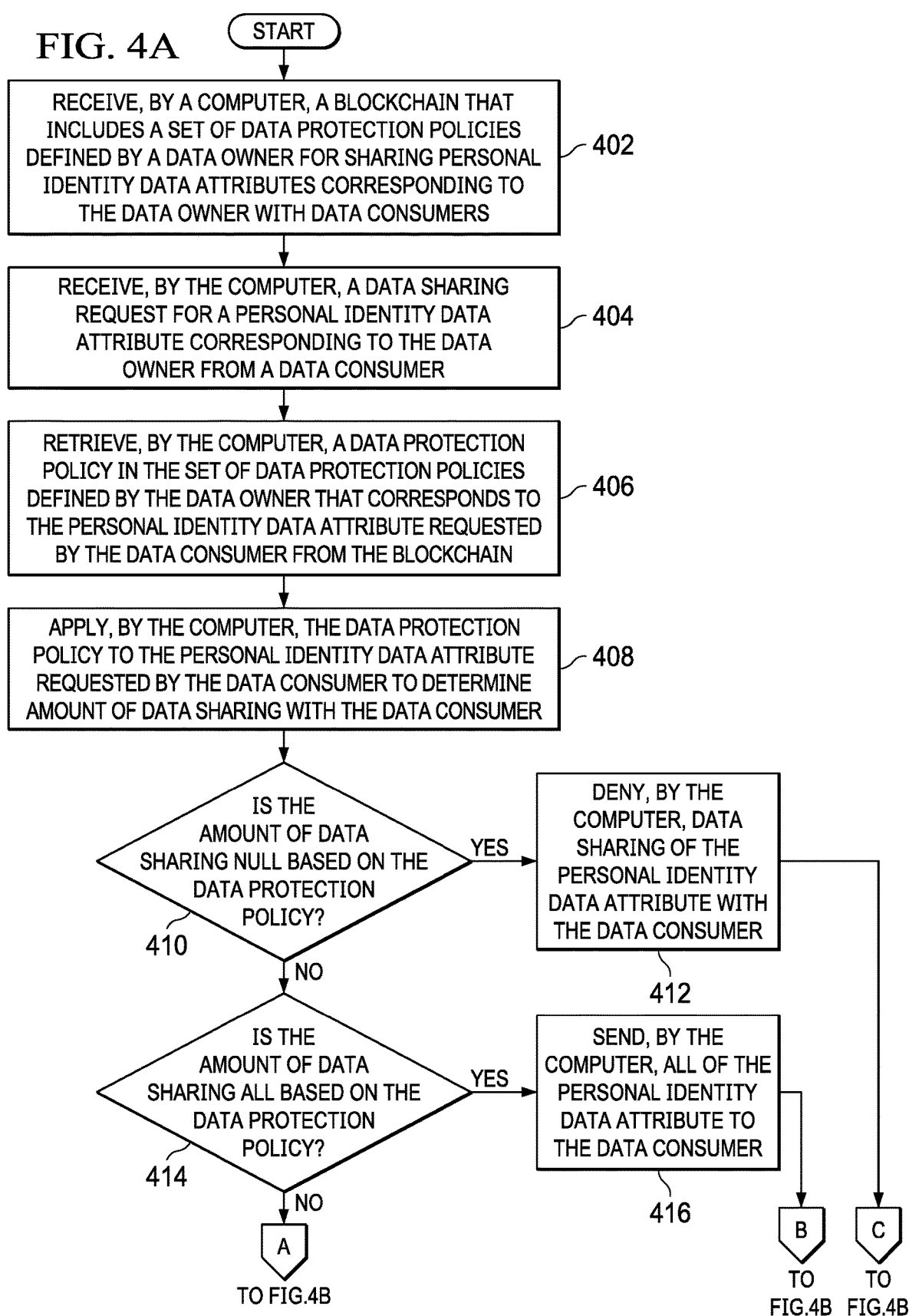

BLOCKCHAIN NETWORK TO PROTECT IDENTITY DATA ATTRIBUTES USING DATA OWNER-DEFINED POLICIES

BACKGROUND

1. Field

The disclosure relates generally to data security and more specifically to applying data owner-defined data protection policies for security of personal identity data corresponding to the data owner within a blockchain environment.

2. Description of the Related Art

Data storage is a general term for archiving data in electromagnetic or other forms for use by a computer or other data processing device. Data storage in a digital, machine-readable medium is sometimes called digital data. Personal digital data is personally identifiable information or sensitive personal information that can be used on its own or with other information to identify or locate a particular individual or to identify that individual in context. Data security means protecting digital data, such as personal information stored in a database, from unwanted access, use, disclosure, modification, or destruction by unauthorized users.

Secure data distribution is critical for data accountability. Entities, such as, for example, organizations, enterprises, agencies, institutions, and the like, assemble large amounts of personally identifiable information for data-driven market analysis and prediction, for example. However, limitations of current data tracking tools restrict detection of unwanted access, use, disclosure, modification, or destruction by unauthorized users. Blockchain technology can be leveraged to establish a transparent data auditing platform.

A blockchain exists as a shared and continuously reconciled database. The distribution and reconciliation of the database can be done automatically, by time, by some internal or extrinsic event, or by other criteria. In each case, a blockchain is a continuously growing chain of data blocks, which are linked and secured using cryptography. Each block typically contains a cryptographic hash of the previous block in the blockchain, as well as a timestamp and data corresponding to an event, such as a financial transaction, operational event, or an output event often called a "smart contract". The cryptographic hash of the previous block in the blockchain, links the two blocks. The linked blocks form the blockchain. Blocks are appended in chronological order. In other words, the last block in the chain is the most recent block. Further, blocks are immutable (i.e., cannot be changed or deleted).

By design, a blockchain is resistant to modification of the data. For use as a distributed, decentralized ledger (i.e., not stored in just one central network node), a blockchain is typically managed by a network of nodes collectively adhering to a protocol for validating new blocks. Each node connected to, or connecting to, the network receives a copy of the blockchain, which is downloaded automatically. Once recorded, the data in any given block cannot be altered retroactively without the alteration of all subsequent blocks.

Thus, decentralized consensus is achieved using a blockchain. This decentralized consensus makes blockchains suitable for the recording of events, medical records, identity management, financial transaction processing, and document provenance, for example. In addition, a blockchain can assign rights because the blockchain provides a record that compels offer and acceptance.

Blockchain-based smart contracts are computer-generated legal contracts that can be partially or fully executed or enforced without human interaction. In other words, a smart contract is a computer protocol that digitally facilitates, verifies, or enforces negotiation or performance of a contract. The blockchain-based smart contract is enabled by programming instructions that define and execute an agreement. The blockchain-based smart contract can write, record, or effect a financial or other transaction, and/or conduct a tangible, real world operation.

SUMMARY

According to one illustrative embodiment, a computer-implemented method for applying data owner-defined data protection policies for identity data security within a blockchain environment is provided. A computer receives a data sharing request for an identity data attribute corresponding to a data owner from a data consumer. The computer retrieves a data protection policy defined by the data owner that corresponds to the identity data attribute requested by the data consumer from a blockchain. The computer applies the data protection policy to the identity data attribute requested by the data consumer to determine amount of data sharing with the data consumer. According to other illustrative embodiments, a computer system and computer program product for applying data owner-defined data protection policies for identity data security within a blockchain environment are provided.

BRIEF DESCRIPTION OF THE DRAWINGS

FIGS. 4A-4B are a flowchart illustrating a process for applying data owner-defined data protection policies for personal identity data security within a blockchain environment in accordance with an illustrative embodiment.

DETAILED DESCRIPTION

Figure 1:
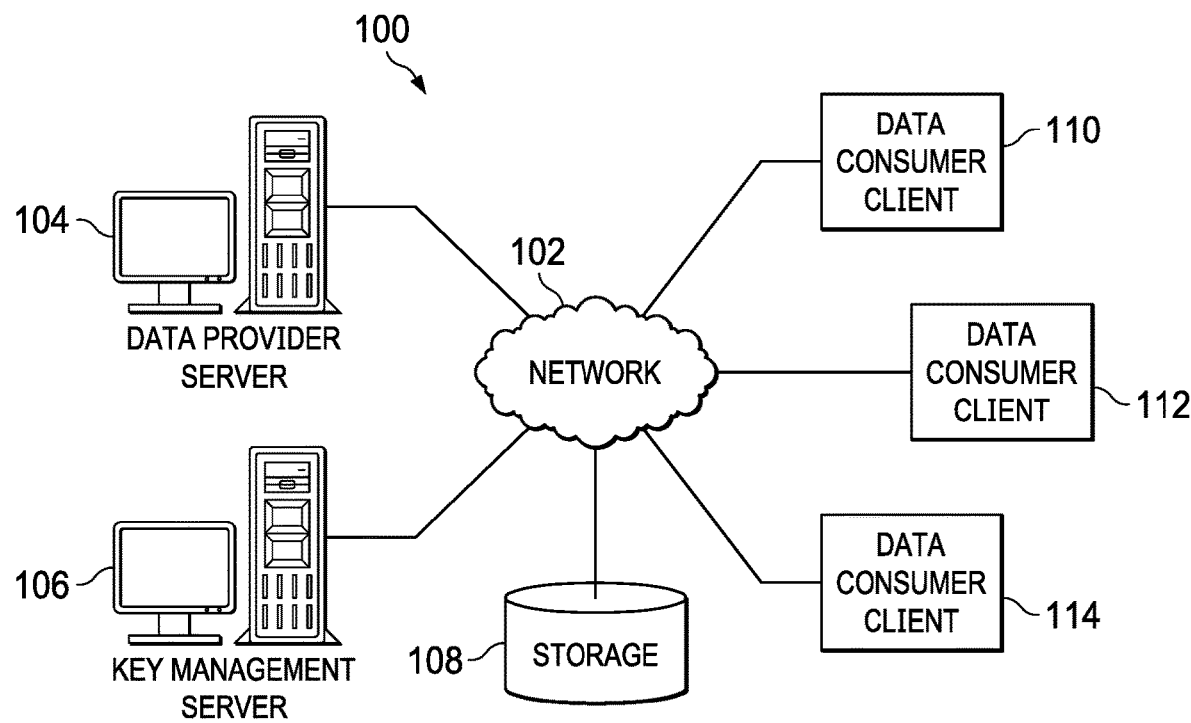
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
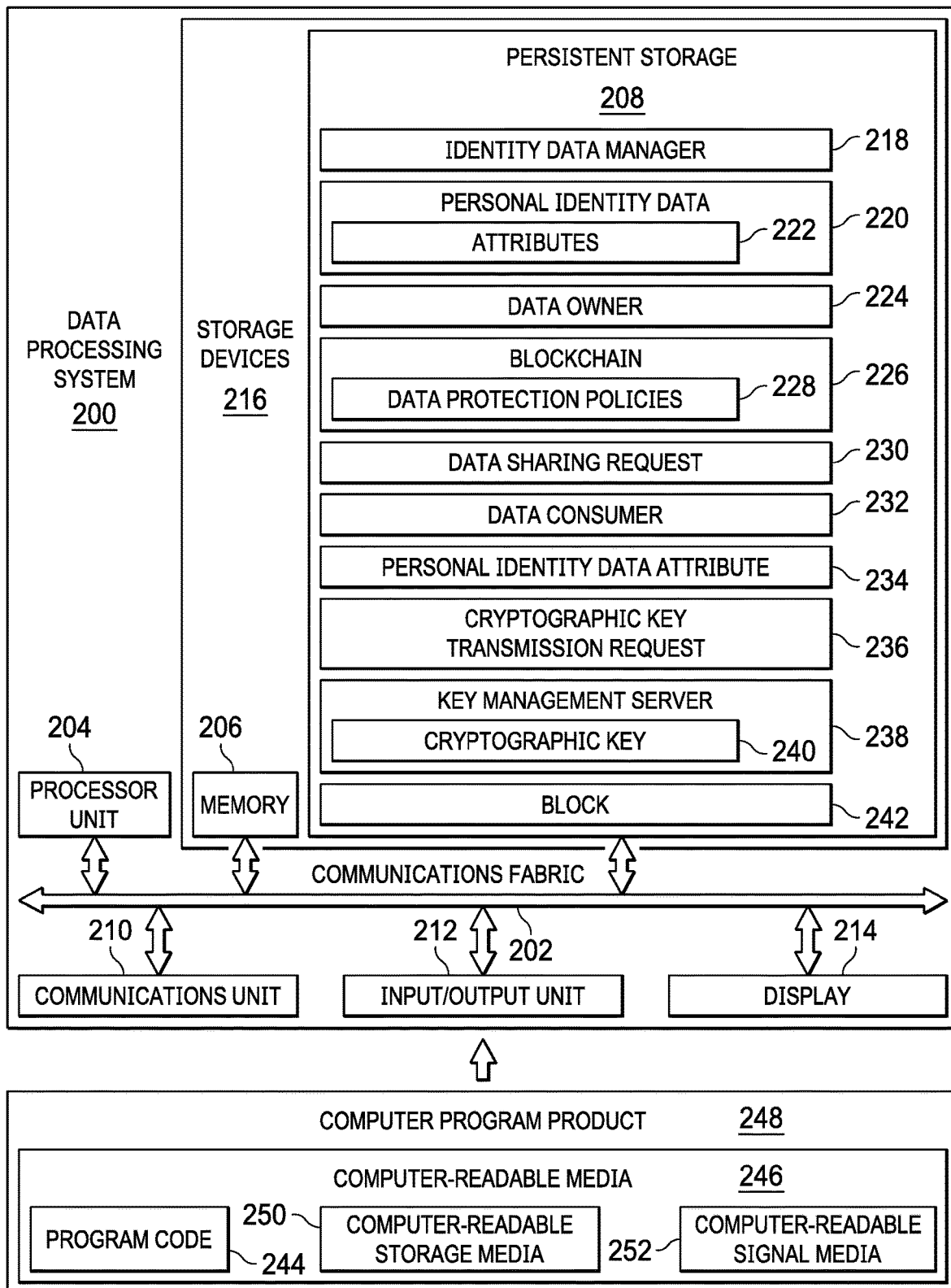
FIG. 2 is a diagram of a data processing system in which illustrative embodiments may be implemented.
Figure 3:
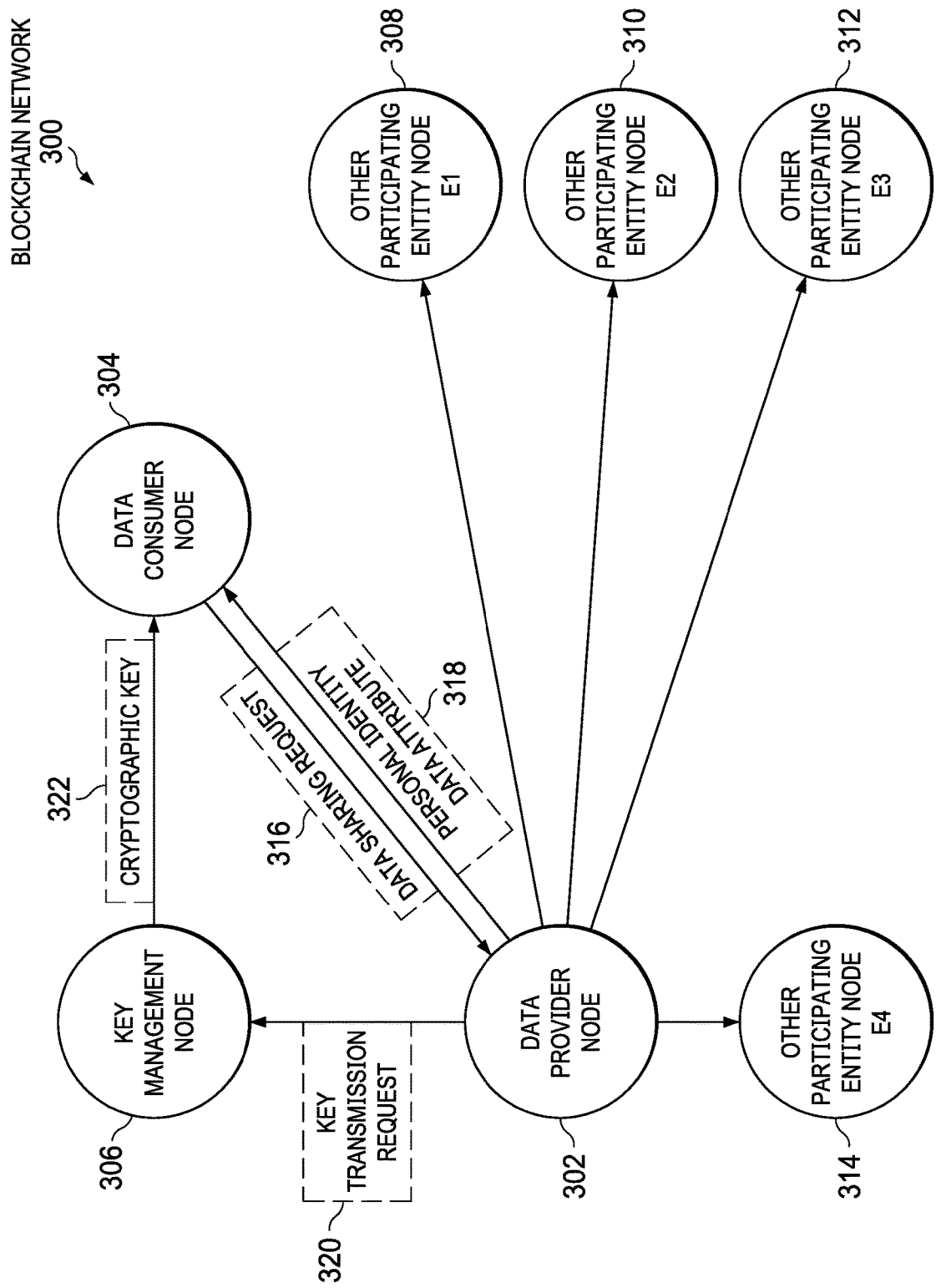
FIG. 3 is a diagram illustrating an example of a blockchain network in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, data provider server 104 and key management server 106 connect to network 102, along with storage 108. Data provider server 104 and key management server 106 may be, for example, server computers with high-speed connections to network 102. In addition, data provider server 104 and key management server 106 provide services to data consumer client devices. For example, data provider server 104 controls the process of sharing identity data attributes, which correspond to a plurality of different data owners, with requesting data consumer client devices. An identity data attribute is any personal information, such as, for example, name, address, social security number, and the like, that may be used to identify a particular data owner. A data owner creates and owns the corresponding digital identity data. A data consumer utilizes or processes received identity data. Key management server 106 provides cryptographic keys to data consumer client devices so that the data consumer client devices can decrypt and access the identity data received from data provider server 104. It should be noted that key management server 106 stores a different cryptographic key for each respective identity data attribute. As a result, access to the personal identity data is at the attribute level.

Also, it should be noted that data provider server 104 and key management server 106 may each represent a cluster of servers in one or more data centers. Alternatively, data provider server 104 and key management server 106 may each represent multiple computing nodes in one or more cloud environments.

Data consumer client 110, data consumer client 112, and data consumer client 114 also connect to network 102. Data consumer clients 110, 112, and 114 are clients of data provider server 104 and key management server 106. Data consumer clients 110, 112, and 114 may include, for example, network computers, desktop computers, laptop computers, handheld computers, smart phones, smart watches, smart televisions, gaming devices, kiosks, and the like, with wire or wireless communication links to network 102. Users of data consumer clients 110, 112, and 114 may utilize data consumer clients 110, 112, and 114 to request that data provider server 104 share identity data attributes with respective data consumer clients 110, 112, and 114.

Storage 108 is a network storage device capable of storing any type of data in a structured format or an unstructured format. In addition, storage 108 may represent a plurality of network storage devices. Further, storage 108 may store a plurality of different identity data attributes corresponding to a plurality of different data owners.

Furthermore, it should be noted that network data processing system 100 may include any number of additional servers, clients, storage devices, and other devices not shown. Moreover, network data processing system 100 may represent a blockchain network of interconnected nodes acting as a distributed ledger for identity data security.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as data provider server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores identity data manager 218. However, it should be noted that even though identity data manager 218 is illustrated as residing in persistent storage 208, in an alternative illustrative embodiment identity data manager 218 may be a separate component of data processing system 200. For example, identity data manager 218 may be a hardware component coupled to communication fabric 202 or a combination of hardware and software components.

Identity data manager 218 controls the process of applying data owner-defined data protection policies for security of personal identity data 220 corresponding to data owner 224 within a blockchain environment. Personal identity data 220 represents a plurality of digital information created by data owner 224 that may be used to personally identify or locate data owner 224. Personal identity data 220 may be stored locally in persistent storage 208 or may be stored remotely in a storage device, such as, for example, storage 108 in FIG. 1. Personal identity data 220 includes attributes 222. Attributes 222 are identifying characteristics of data owner 224, such as, for example, name, address, phone number, social security number, driver license number, email address, license plate number, bank account number, and the like.

Blockchain 226 represents an immutable distributed ledger shared between nodes connected to the blockchain network. Blockchain 226 includes data protection policies 228, which are defined by data owner 224. It should be noted that data protection policies 228 are in compliance with applicable data protection regulations corresponding to personal identity data 220. It should be noted that blockchain 226 may contain a plurality of different data protection policies defined by a plurality of different data owners. Data owner 224 defines a data protection policy for each of attributes 222 in personal identity data 220. A data protection policy controls which requesting entities may access a particular attribute and how much (e.g., all or only a portion) of that particular attribute a particular requesting entity may access.

Data sharing request 230 represents a request from data consumer 232 to receive from data processing system 200 an attribute in attributes 222 of personal identity data 220 (i.e., personal identity data attribute 234). Data consumer 232 represents an identifier of the requesting entity. Data consumer 232 may be, for example, data consumer client 110 in FIG. 1.

Upon receiving data sharing request 230, identity data manager 218 retrieves a data protection policy, which only corresponds to personal identity data attribute 234 (i.e., the requested attribute), from data protection policies 228 in blockchain 226. Identity data manager 218 utilizes the retrieved data protection policy to determine whether to share personal identity data attribute 234 with data consumer 232 or not, and if so, how much of personal identity data attribute 234 to share with data consumer 232. If the decision is not to share personal identity data attribute 234 with data consumer 232 based on the retrieved data security policy, then identity data manager 218 denies access to personal identity data attribute 234. If the decision is to share all of personal identity data attribute 234 with data consumer 232 based on the retrieved data security policy, then identity data manager 218 shares personal identity data attribute 234 in its entirety with data consumer 232. If the decision is to share only a portion of personal identity data attribute 234 with data consumer 232 based on the retrieved data security policy, then identity data manager 218 transforms personal identity data attribute 234 by, for example, obfuscating one or more characters (e.g., letters and/or numbers) of personal identity data attribute 234 before sharing with data consumer 232.

When sharing all or a portion of personal identity data attribute 234 with data consumer 232, identity data manager 218 sends cryptographic key transmission request 236 to key management server 238. Key management server 238 represents an identifier of a key management server, such as, for example, key management server 106 in FIG. 1, that stores a plurality of cryptographic keys corresponding to attributes 222 of personal identity data 220. Cryptographic key transmission request 236 is a request for key management server 238 to send to data consumer 232 a specific cryptographic key (i.e., cryptographic key 240), which only corresponds to personal identity data attribute 234. Upon receiving cryptographic key 240, data consumer 232 utilizes cryptographic key 240 to decrypt personal identity data attribute 234 for processing.

After completing the data sharing transaction, identity data manager 218 records the data sharing transaction in block 242. Block 242 may contain, for example, an identifier of data processing system 200, an identifier of data consumer 232, date and time of the data sharing transaction, an identifier of the retrieved data protection policy corresponding to personal identity data attribute 234, metadata corresponding to personal identity data attribute 234, and the like. Then, identity data manager 218 appends block to an end of blockchain 226 and sends appended blockchain 226 to all of the other nodes connected to the blockchain network.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of nontangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Governmental entities are enacting data protection regulations, such as, for example, the General Data Protection Regulation (GDPR) implemented by the European Union, regarding the processing and movement of personal data corresponding to individuals. The overarching purpose of these data protection regulations is to introduce an extensive data protection regime by imposing broad obligations on those who collect personal data, as well as conferring broad rights on individuals about whom data is collected. It should be noted that data sharing between entities is permissible, as long as the data sharing is performed in accordance with the data protection regulations.

The sharing of data between two or more entities may take the form of data sharing between joint data providers or between a data provider and a data consumer, such as a data processor. Even though each instance of data sharing should be analyzed on its own facts, in the context of data sharing between entities it is more likely that the data sharing will be between a data provider and a data consumer. Data protection regulations increase the obligations on both data providers and data consumers. Data protection regulations provide the lawful basis for data processing (e.g., consent, legitimate interests, and the like). Further processing of the data beyond that which was originally anticipated is only permitted as long as the new processing activity is not incompatible with that of the original purpose. Consequently, at the point of considering sharing data, an assessment will be required as to whether the data sharing is within the original lawful basis for processing. When assessing the appropriate level of security, data providers and data consumers must take into account the risks of processing the data, which may cause, for example, accidental or unlawful destruction, loss, alteration, or unauthorized disclosure of, or access to personal data transmitted, stored, or otherwise processed.

Handling identity data is not binary in the real world anymore and is more grey-scaled. For example, sharing one or more identity data attributes corresponding to a data owner by a data provider with a particular data consumer may have little to no risk involved, but may have considerable risk when sharing the same identity data attributes with a different data consumer. The data owner is an individual that creates, edits, modifies, and restricts access to the identity data attributes corresponding to that particular data owner. The level of risk involved with sharing identity data attributes may depend upon the type of data consumer that wants access to one or more of the identity data attributes.

Current data protection solutions are not focused on the type of data consumer that identity data attributes are being shared with. Illustrative embodiments handle exposure of identity data at the attribute level using a blockchain network and data protection policies defined by data owners. Identity data attributes corresponding to a data owner may include, for example, first name, last name, social security number, residential address, phone number, email address, and the like. Each identity data attribute has a different level of importance to the data owner. For example, the social security number may have a high-level of importance to the data owner with a high-level of sharing risk and the email address may have a low-level of importance to the data owner with a low-level of sharing risk. It should be noted that some identity data attributes listed above are important to specific domains, such as, for example, the social security number may be important to certain governmental agencies, such as the internal revenue service, for identification, the residential address may be important to the census bureau for population density statistics, and the like.

As an example scenario, the data owner defines a data protection policy regarding the sharing of the social security number corresponding to the data owner. The data protection policy states that the data provider may only share the first two and last two numbers of the social security number with a third-party entity in a financial domain, for example, to protect full exposure of social security number. The data protection policy also states that the data provider may share the entire social security number when the data sharing request is from a governmental agency, such as, for example, the internal revenue service. As a result, the data owner is able to protect identity data attributes corresponding to the data owner that that data provider is sharing with a third-party entity (i.e., data consumer). It should be noted that the data owner may provide a data protection policy for each attribute of the data owner's identity data. Consequently, the sharing of the data owner's identity data by a data provider with a third-party data consumer will only happen in accordance with the data protection policies defined by the data owner. This provides the data owner with control over identity data sharing, which until now the control has been with the data provider only.

The example scenario above is a simple example. It should be noted that the data owner may define complex data protection policies for identity data attribute sharing, which may involve their own custom application and interaction with outside entities. Access to identity data attributes is via cryptographic keys provided by a key management server connected to the blockchain network. The key management server stores and provides the cryptographic keys at the attribute level. In other words, a data consumer can only access those identity data attributes for which a cryptographic key is provided to the data consumer from the key management server. Thus, illustrative embodiments enable granular attribute level access to identity data so that a single attribute of identity data is a logical unit of data.

In addition to using a key management server, illustrative embodiments also utilize the blockchain network to manage the identity data attributes. Illustrative embodiments utilize the blockchain network to pass information between multiple data providing entities and multiple data consuming entities in a fully automated and secure manner. A data provider to a data sharing transaction with a data consumer, generates a block in the blockchain upon completion of the data sharing transaction. This block is verified by, for example, hundreds, thousands, or even millions of computer nodes distributed throughout the blockchain network as part of the blockchain network. The data provider adds the verified block to the blockchain, which is stored across the nodes within the blockchain network creating not just a unique identity data attribute, but a unique identity data attribute with a unique history. As a result, falsifying an identity data attribute would mean falsifying an entire blockchain comprising, for example, millions of instances, which is virtually impossible.

Thus, illustrative embodiments handle identity data sharing at the attribute level and mitigate data exposure risk using user-defined data protection policies. In other words, illustrative embodiments only expose identity data per user-defined risk involved with sharing a particular identity data attribute. Further, illustrative embodiments enable different representations of the same identity data attribute to different data consumers based on the data protection policies defined by the data owner.

Accordingly, illustrative embodiments provide one or more technical solutions that overcome a technical problem with protecting identity data attributes of individuals. As a result, these one or more technical solutions provide a technical effect and practical application in the field of data security.

With reference now to FIG. 3, a diagram illustrating an example of a blockchain network is depicted in accordance with an illustrative embodiment. Blockchain network 300 may be implemented in a network of data processing systems, such as network data processing system 100 in FIG. 1. Blockchain network 500 is a network of nodes for controlling access and exposure to identity data attributes of a data owner using custom data owner-defined data protection policies.

In this example, blockchain network 300 includes data provider node 302, data consumer node 304, key management node 306, other participating entity node E1 308, other participating entity node E2 310, other participating entity node E3 312, and other participating entity node E4 314. However, it should be noted that blockchain network 300 may include any number of nodes. Data provider node 302, data consumer node 304, and key management node 306 may be, for example, data provider server 104, data consumer client 110, and key management server 106 in FIG. 1.

Data provider node 302 receives data sharing request 316 for an identity data attribute corresponding to a data owner from data consumer node 304. In response, data provider node 302 obtains a data protection policy defined by the data owner that corresponds to the requested identity data attribute. Data provider node 302 applies the data protection policy to the data sharing request received from data consumer node 304 to determine a data access determination. The data access determination is one of allow access to the entire identity data attribute, deny access to the identity data attribute, or transform the identity data attribute allowing only a portion, and not all, of the identity data attribute to be accessed.

Based on determining that the data access decision is one of allow or transform, data provider node 302 sends personal identity data attribute 318 to data consumer node 304. Moreover, data provider node 302 sends key transmission request 320 to key management node 306. In response to receiving key transmission request 320, key management node 306 sends cryptographic key 322 to data consumer node 304. It should be noted that cryptographic key 322 corresponds to personal identity data attribute 318 specifically. Data consumer node 304 uses cryptographic key 322 to decrypt and access personal identity data attribute 318.

Once data provider node 302 shares personal identity data attribute 318 with data consumer node 304 based on the data protection policy defined by the data owner, data provider node 302 records the data sharing transaction in a block and attaches the block to the end of the blockchain. After attaching the block to the blockchain, data provide node 302 sends the updated blockchain to all other members of blockchain network 300 (i.e., other participating entity node E1 308, other participating entity node E2 310, other participating entity node E3 312, and other participating entity node E4 314). Thus, illustrative embodiments enable blockchain network 300 to control each identity data attribute sharing transaction per a corresponding data protection policy defined by the data owner at the identity data attribute level.

Figure 4B:
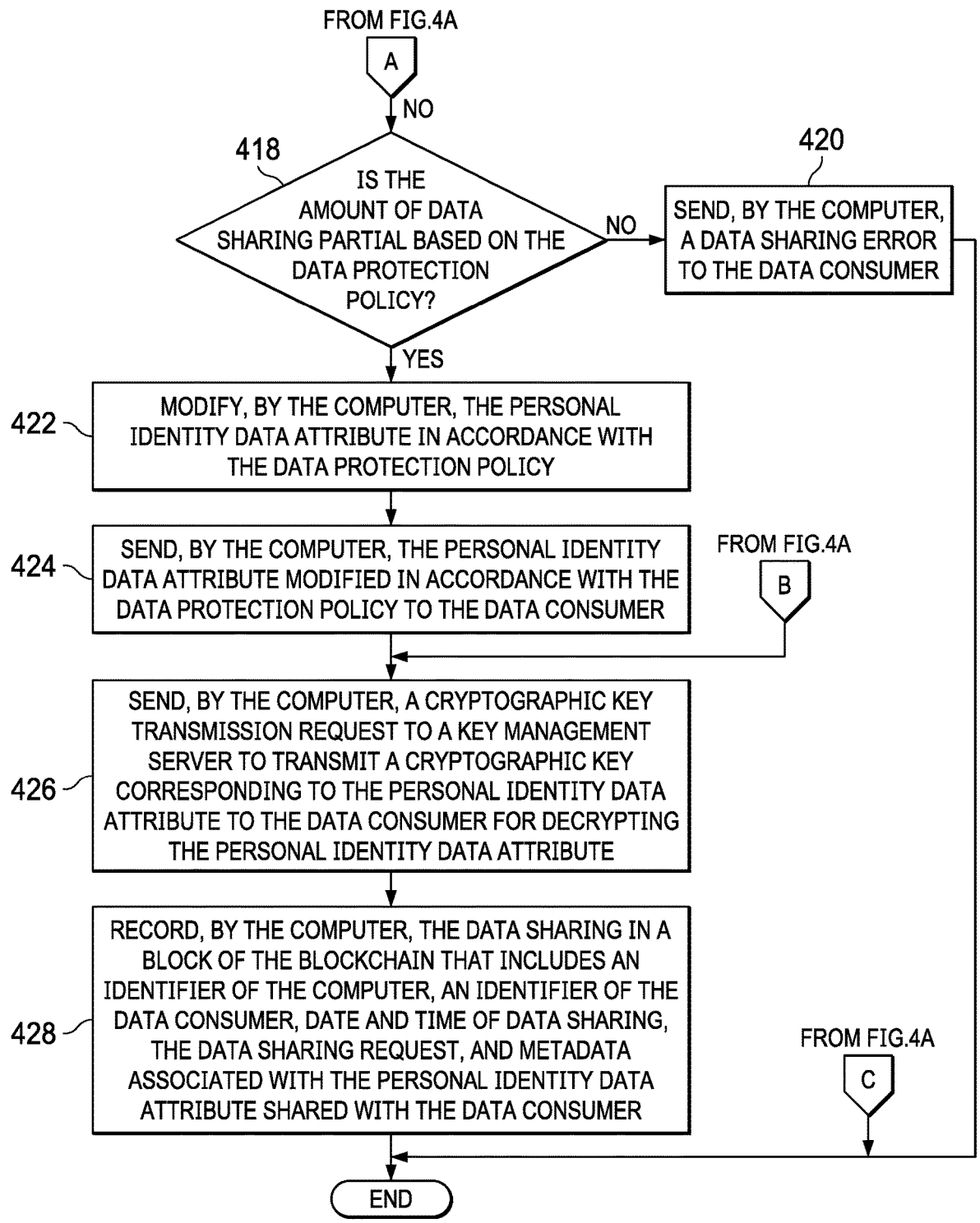

With reference now to FIGS. 4A-4B, a flowchart illustrating a process for applying data owner-defined data protection policies for personal identity data security within a blockchain environment is shown in accordance with an illustrative embodiment. The process shown in FIGS. 4A-4B may be implemented in a computer, such as, for example, data provider server 104 in FIG. 1 or data processing system 200 in FIG. 2.

The process begins when the computer receives a blockchain that includes a set of data protection policies defined by a data owner for sharing personal identity data attributes corresponding to the data owner with data consumers (step 402). Subsequently, the computer receives a data sharing request for a personal identity data attribute corresponding to the data owner from a data consumer (step 404). The computer retrieves a data protection policy in the set of data protection policies defined by the data owner that corresponds to the personal identity data attribute requested by the data consumer from the blockchain (step 406).

The computer applies the data protection policy to the personal identity data attribute requested by the data consumer to determine amount of data sharing with the data consumer (step 408). Afterward, the computer makes a determination as to whether the amount of data sharing is null based on the data protection policy (step 410). If the computer determines that the amount of data sharing is null based on the data protection policy, yes output of step 410, then the computer denies data sharing of the personal identity data attribute with the data consumer (step 412) and the process terminates thereafter. If the computer determines that the amount of data sharing is not null based on the data protection policy, no output of step 410, then the computer makes a determination as to whether the amount of data sharing is all based on the data protection policy (step 414).

If the computer determines that the amount of data sharing is all based on the data protection policy, yes output of step 414, then the computer sends all of the personal identity data attribute to the data consumer (step 416) and the process proceeds to step 426 thereafter. If the computer determines that the amount of data sharing is not all based on the data protection policy, no output of step 414, then the computer makes a determination as to whether the amount of data sharing is partial based on the data protection policy (step 418).

If the computer determines that the amount of data sharing is not partial based on the data protection policy, no output of step 418, then the computer sends a data sharing error to the data consumer (step 420) and the process terminates thereafter. If the computer determines that the amount of data sharing is partial based on the data protection policy, yes output of step 418, then the computer modifies the personal identity data attribute in accordance with the data protection policy (step 422). Modifying the personal identity data attribute may include, for example, masking a portion of the personal identity data attribute, obfuscating a portion of the personal identity data attribute, hiding a portion of the personal identity data attribute, or the like. In other words, only a specified portion of the personal identity data attribute will be accessible.

Afterward, the computer sends the personal identity data attribute modified in accordance with the data protection policy to the data consumer (step 424). Further, the computer sends a cryptographic key transmission request to a key management server to transmit a cryptographic key corresponding to the personal identity data attribute to the data consumer for decrypting the personal identity data attribute (step 426). Furthermore, the computer records the data sharing in a block of the blockchain that includes an identifier of the computer, an identifier of the data consumer, date and time of data sharing, the data sharing request, and metadata associated with the personal identity data attribute shared with the data consumer (step 428). Thereafter, the process terminates.

Thus, illustrative embodiments of the present invention provide a computer-implemented method, computer system, and computer program product for applying data owner-defined data protection policies for identity data security within a blockchain environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for applying data owner-defined data protection policies for identity data security within a blockchain environment, the computer-implemented method comprising:
   receiving, by a computer, a data sharing request for an identity data attribute corresponding to a data owner from a data consumer;
   retrieving, by the computer, a data protection policy defined by the data owner that corresponds to the identity data attribute requested by the data consumer from a blockchain;
   applying, by the computer, the data protection policy to the identity data attribute requested by the data consumer to determine amount of data sharing with the data consumer; and
   sending, by the computer, a cryptographic key transmission request to a key management server to transmit a cryptographic key corresponding to the identity data attribute to the data consumer for decrypting the identity data attribute, wherein access to identity data is provided granularly at an attribute level by associating multiple cryptographic keys with the identity data of the data owner, with each cryptographic key corresponding to a different data attribute of the identity data.

2. The computer-implemented method of claim 1 further comprising:
   determining, by the computer, whether the amount of data sharing is null based on the data protection policy defined by the data owner; and
   responsive to the computer determining that the amount of data sharing is null based on the data protection policy defined by the data owner, denying, by the computer, data sharing of the identity data attribute with the data consumer.

3. The computer-implemented method of claim 1 further comprising:
   determining, by the computer, whether the amount of data sharing is all based on the data protection policy defined by the data owner; and
   responsive to the computer determining that the amount of data sharing is all based on the data protection policy defined by the data owner, sending, by the computer, all of the identity data attribute to the data consumer.

4. The computer-implemented method of claim 1 further comprising:
   determining, by the computer, whether the amount of data sharing is partial based on the data protection policy defined by the data owner; and
   responsive to the computer determining that the amount of data sharing is partial based on the data protection policy defined by the data owner, modifying, by the computer, the identity data attribute in accordance with the data protection policy defined by the data owner and sending, by the computer, the identity data attribute modified in accordance with the data protection policy defined by the data owner to the data consumer.

5. The computer-implemented method of claim 1 further comprising:
   recording, by the computer, the data sharing in a block of the blockchain, wherein the block includes an identifier of the computer, an identifier of the data consumer, date and time of the data sharing, the data sharing request, and metadata associated with the identity data attribute shared with the data consumer.

6. The computer-implemented method of claim 1 further comprising:
   receiving, by the computer, the blockchain that includes a set of data protection policies defined by the data owner for sharing identity data attributes corresponding to the data owner with data consumers.

7. The computer-implemented method of claim 6, wherein the set of data protection policies defined by the data owner is in compliance with applicable data protection regulations corresponding to the identity data attributes.

8. The computer-implemented method of claim 1, wherein the computer provides different representations of the identity data attribute to different data consumers based on the data protection policy defined by the data owner.

9. A computer system for applying data owner-defined data protection policies for identity data security within a blockchain environment, the computer system comprising:
a bus system;
a storage device connected to the bus system, wherein the storage device stores program instructions; and
a processor connected to the bus system, wherein the processor executes the program instructions to:
receive a data sharing request for an identity data attribute corresponding to a data owner from a data consumer;
retrieve a data protection policy defined by the data owner that corresponds to the identity data attribute requested by the data consumer from a blockchain;
apply the data protection policy to the identity data attribute requested by the data consumer to determine amount of data sharing with the data consumer; and
send a cryptographic key transmission request to a key management server to transmit a cryptographic key corresponding to the identity data attribute to the data consumer for decrypting the identity data attribute, wherein access to identity data is provided granularly at an attribute level by associating multiple cryptographic keys with the identity data of the data owner, with each cryptographic key corresponding to a different data attribute of the identity data.

10. The computer system of claim 9, wherein the processor further executes the program instructions to:
determine whether the amount of data sharing is null based on the data protection policy defined by the data owner; and
deny data sharing of the identity data attribute with the data consumer in response to determining that the amount of data sharing is null based on the data protection policy defined by the data owner.

11. The computer system of claim 9, wherein the processor further executes the program instructions to:
determine whether the amount of data sharing is all based on the data protection policy defined by the data owner; and
send all of the identity data attribute to the data consumer in response to determining that the amount of data sharing is all based on the data protection policy defined by the data owner.

12. The computer system of claim 9, wherein the processor further executes the program instructions to:
determine whether the amount of data sharing is partial based on the data protection policy defined by the data owner; and
modify the identity data attribute in accordance with the data protection policy defined by the data owner and send the identity data attribute modified in accordance with the data protection policy defined by the data owner to the data consumer in response to determining that the amount of data sharing is partial based on the data protection policy defined by the data owner.

13. The computer system of claim 9, wherein the processor further executes the program instructions to:
record the data sharing in a block of the blockchain, wherein the block includes an identifier of the computer, an identifier of the data consumer, date and time of the data sharing, the data sharing request, and metadata associated with the identity data attribute shared with the data consumer.

14. The computer system of claim 9, wherein the processor further executes the program instructions to:
receive the blockchain that includes a set of data protection policies defined by the data owner for sharing identity data attributes corresponding to the data owner with data consumers.

15. A computer program product for applying data owner-defined data protection policies for identity data security within a blockchain environment, the computer program product comprising a computer readable storage medium having program instructions embodied therewith, the program instructions executable by a computer to cause the computer to perform a method comprising:
receiving, by the computer, a data sharing request for an identity data attribute corresponding to a data owner from a data consumer;
retrieving, by the computer, a data protection policy defined by the data owner that corresponds to the identity data attribute requested by the data consumer from a blockchain;
applying, by the computer, the data protection policy to the identity data attribute requested by the data consumer to determine amount of data sharing with the data consumer; and
sending, by the computer, a cryptographic key transmission request to a key management server to transmit a cryptographic key corresponding to the identity data attribute to the data consumer for decrypting the identity data attribute, wherein access to identity data is provided granularly at an attribute level by associating multiple cryptographic keys with the identity data of the data owner, with each cryptographic key corresponding to a different data attribute of the identity data.

16. The computer program product of claim 15 further comprising:
determining, by the computer, whether the amount of data sharing is null based on the data protection policy defined by the data owner; and
responsive to the computer determining that the amount of data sharing is null based on the data protection policy defined by the data owner, denying, by the computer, data sharing of the identity data attribute with the data consumer.

17. The computer program product of claim 15 further comprising:
determining, by the computer, whether the amount of data sharing is all based on the data protection policy defined by the data owner; and
responsive to the computer determining that the amount of data sharing is all based on the data protection policy defined by the data owner, sending, by the computer, all of the identity data attribute to the data consumer.

18. The computer program product of claim 15 further comprising:
determining, by the computer, whether the amount of data sharing is partial based on the data protection policy defined by the data owner; and
responsive to the computer determining that the amount of data sharing is partial based on the data protection policy defined by the data owner, modifying, by the computer, the identity data attribute in accordance with the data protection policy defined by the data owner and sending, by the computer, the identity data attribute modified in accordance with the data protection policy defined by the data owner to the data consumer.

19. The computer program product of claim 15 further comprising:

recording, by the computer, the data sharing in a block of the blockchain, wherein the block includes an identifier of the computer, an identifier of the data consumer, date and time of the data sharing, the data sharing request, and metadata associated with the identity data attribute shared with the data consumer.

20. The computer program product of claim 15 further comprising:

receiving, by the computer, the blockchain that includes a set of data protection policies defined by the data owner for sharing identity data attributes corresponding to the data owner with data consumers.

* * * * *